United States Patent [19]
Gochenouer et al.

[11] Patent Number: 6,056,007
[45] Date of Patent: May 2, 2000

[54] AIR TANK MANIFOLD

[75] Inventors: Frederick C. Gochenouer, Mechanicsburg; Richard C. Pickering, Urbana, both of Ohio

[73] Assignee: Q₃ JMC, Inc., Urbana, Ohio

[21] Appl. No.: 09/114,536

[22] Filed: Jul. 13, 1998

Related U.S. Application Data

[60] Provisional application No. 60/052,570, Jul. 15, 1997.

[51] Int. Cl.⁷ .................................................. B64G 1/00
[52] U.S. Cl. .................... 137/351; 137/561 A; 137/588; 137/590
[58] Field of Search .............................. 137/561 A, 574, 137/590, 588, 171, 197, 351

[56] References Cited

U.S. PATENT DOCUMENTS

| | | | |
|---|---|---|---|
| 554,458 | 2/1896 | Rebsamen | 137/588 |
| 566,024 | 8/1896 | Scheutte et al. | 137/588 |
| 1,683,021 | 9/1928 | Brown | 137/590 |
| 3,650,551 | 3/1972 | Akers | 285/158 |
| 3,854,526 | 12/1974 | Cole et al. | 137/590 |
| 4,139,020 | 2/1979 | Sebo | 137/454.2 |
| 4,564,246 | 1/1986 | Billeter | 303/85 |
| 5,230,539 | 7/1993 | Olson | 285/323 |
| 5,236,250 | 8/1993 | Moody et al. | 303/7 |
| 5,287,987 | 2/1994 | Gaiser | 220/589 |

*Primary Examiner*—A. Michael Chambers
*Attorney, Agent, or Firm*—Biebel & French

[57] ABSTRACT

Manifolds for mounting in the domed end cap of an air reserve tanks for a truck or the like have bodies which have central openings in communication with an opening formed in the tank end cap and which provide a plurality of outlet passages which are in communication with the inlet opening. The outlet passages may be provided with push-to-connect tube or hose retaining fittings, inlet check valves, pressure relief valves or the like by which the manifolds provide for multiple air line connections to a common tank. Embodiments of the manifold are shown as applied to metal and to composite tanks.

6 Claims, 6 Drawing Sheets

AIR TANK MANIFOLD

PRIOR PROVISIONAL APPLICATION

Applicant claims the benefit of the filing date of Provisional Application Ser. No. 60/052,570, filed Jul. 15, 1997.

BACKGROUND

This invention relates to multiple port manifolds for air tanks, such as an air storage tank for suppling air to the air-pressure operated or supplying components of a truck or semi-trailer, such as to an air compressor or to the air brakes.

Commonly, fittings on metal air tanks have been made by punching or forming a hole in the wall of the tank and welding a threaded bushing at the hole, having internal NPT-type pipe threads. The connector or device to be mounted or supported would have corresponding NPT interference-fit threads and would thus be connected to communicate with the tank interior. Such arrangements have led to persistent leakage problems since NPT-type threads do not reliably hold air pressure, such as where the working pressures may run as high as 150 psi or more.

Thus, for particular tanks, a plurality of such welded bushings have been used, one for each pneumatic line which is extended from the tank, one for the tank inlet, to incorporate a check valve, and still another to incorporate a drain valve to permit condensed water to be drained from the tank, and perhaps another to receive a high pressure release valve.

Commonly, the tank closest to the air compressor is known as a "wet" tank since it receives condensed moisture in the line from the pump. Such wet tanks have thus been required to have some means for draining out the condensed moisture in the form of a bushing-mounted valve, commonly located at the bottom of the tank.

Thus, in some instances, there is a proliferation of individual fittings mounted on an outside wall of the tank, such as at an end wall, each providing a separate function, in which the tank interior then acts as a manifold for all of the fittings. Obviously, the likelihood of problems, such as leakage, is increased.

There is accordingly a need for an air tank manifold construction that provides for the elimination of threaded connections, and has provision for incorporating a plurality of functions, including check valve functions and water drainage finctions, which uses reliable push-to-connect fittings for flexible hose connections, and which may be employed for a plurality of functions as may be required in connection with air pressure storage tanks on a motor vehicle.

Lightweight composite air pressure tanks are beginning to replace the traditional metal tanks in truck and semi-trailer operations and the like. Such composite tanks do not lend themselves to conventional attachments such as bushings as have been used in the past in connection with metal tanks. There is accordingly a need for an air tank manifold particularly adapted for use with composite tanks.

SUMMARY OF THE INVENTION

The multiple-port manifolds for air tanks, according to this invention, are designed to be used in metal tanks, such as steel or aluminum, or on composite-wound air tanks, such as for heavy duty air systems for truck air brakes and the like. The common maximum working pressure for such reservoirs is 150 PSI gauge. The multiple-port manifolds of this invention are designed both as a distributor of air lines and as a housing for valves which are typically found in truck air brake reservoirs, including one way check valve, pressure protection valves, drain valves, pressure relief valves, and the like.

At the present time, on metal tanks, air tank connection locations are found anywhere on the body of the tank or at either end of the tank. The manifold arrangement of this invention allows all of the air lines to be routed to one location, which provides an assistance in standardizing air harnesses and reducing costs. The manifolds are designed to employ push-to-connect fittings, thereby eliminating the now-used NPT-type thread with compression fittings, that are labor intensive and prone to leakage.

A particularly advantageous composite tank for air pressure sources on motor vehicles and the like is that shown in the U.S. Pat. No. 5,287,987 of Gaiser issued Feb. 22, 1994. A particular form of the manifold, adapted for use on a composite tank of the general kind described in the Gaiser patent, is disclosed herein.

It is accordingly an object of this invention to provide a multi-function manifolds for mounting on a domed or head end of an air pressure reservoir in a truck air brake system by which a supply of air under pressure is provided to a plurality of air pressure utilization devices, having a body that forms a plurality of laterally-extending cylindrical passageways, with inner ends opening into a central common passage and outer ends that receive push-to-connect fittings therein.

Preferred embodiments provide manifolds with eight connections arranged in four orthogonally-related pairs of side-by-side located ports leading into a centrally common passage or inlet.

A further object of the invention is the provision of a multi-function manifold for a vehicle air pressure tank that is provided with a plurality of individual ports or outlets formed or provided with push-to-connect fittings by which air hoses may be attached to the tank at a common location.

A further object of the invention is the provision of a multi-function manifold for a composite vehicle air pressure tank, as outlined above.

A particular advantage of the manifolds of this invention is that the number of tank connections through the tank wall is reduced to one, and the problem of leakage or proper fitting is substantially reduced.

Other objects and advantages of the invention will be apparent from the following description, the accompanying drawings and the appended claims.

DESCRIPTION OF THE PREFERRED EMBODIMENT

Figure 2:
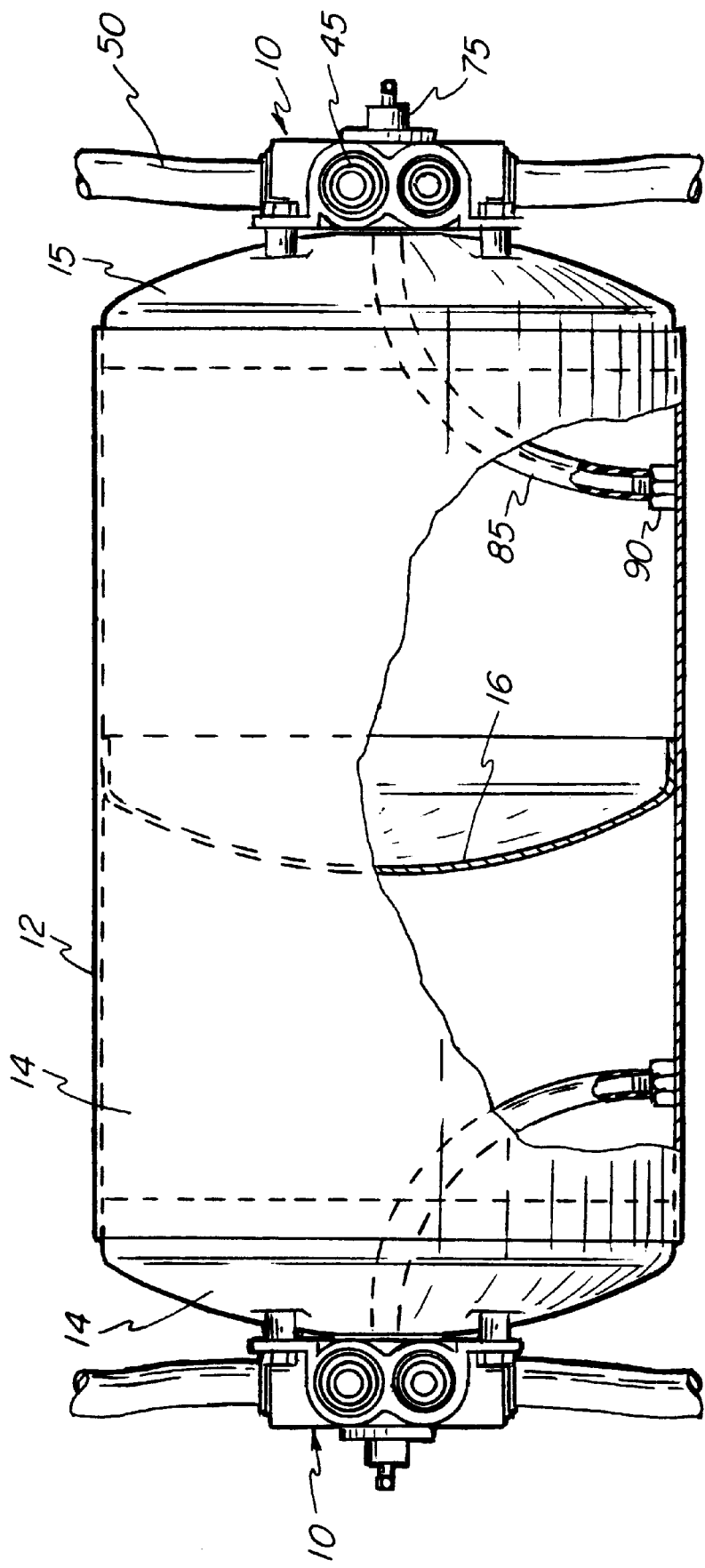
FIG. 2 is a side elevation of a dual-chamber air pressure tank for trucks in which a manifold, according to this invention, is mounted on each of the domed ends of the tank.
Figure 3:
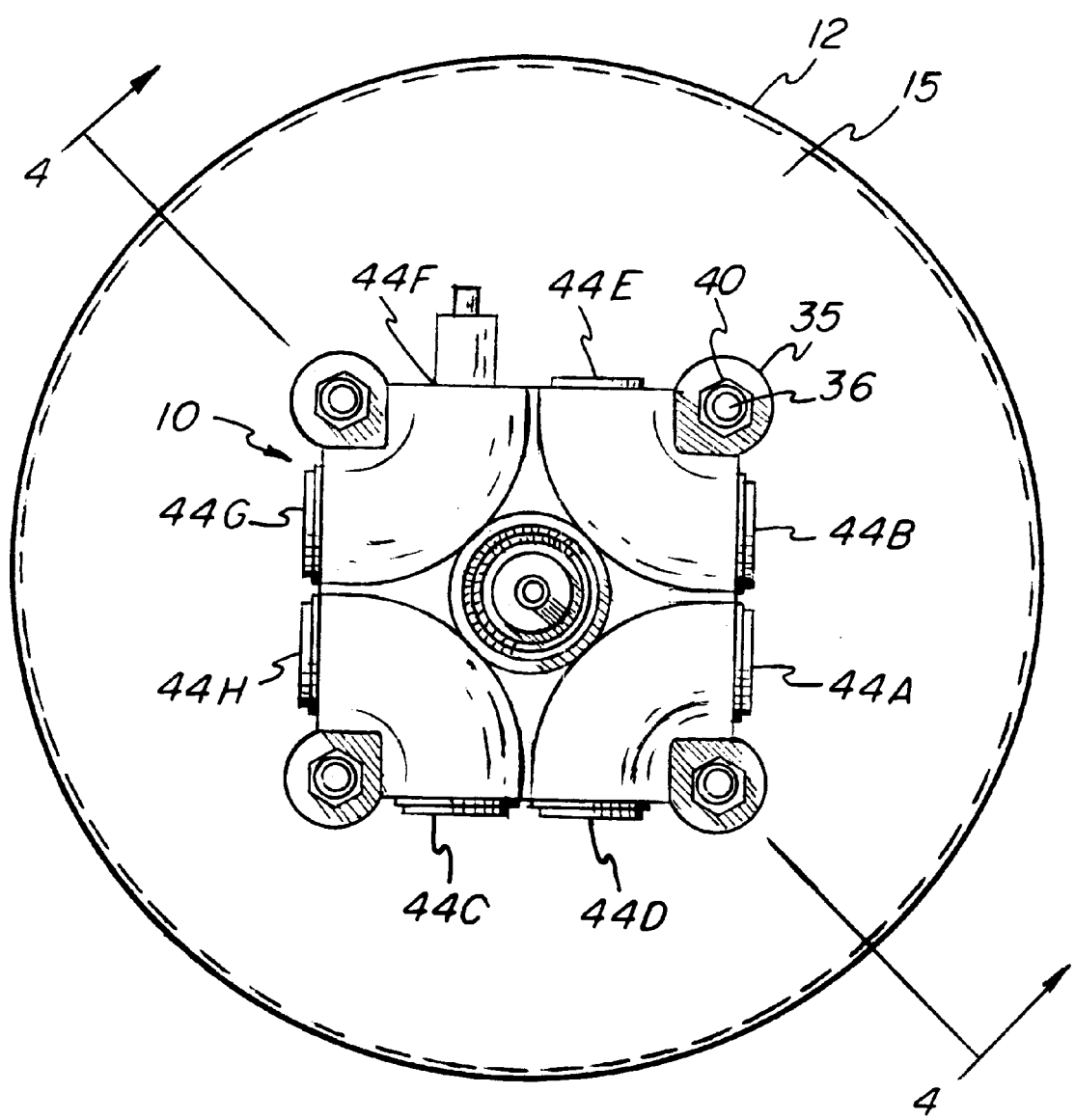
FIG. 3 is a top plan view of the manifold of FIG. 2 mounted on the domed end cap of a metal air pressure tank.

Referring to the figures of the drawing, which illustrate preferred embodiments of the invention, a manifold made in accordance with this invention is shown generally at 10. As shown in FIGS. 2 and 3, the manifold 10 is mounted on a domed end cap of a metal cylindrical air reservoir tank. In FIG. 2, a dual-chamber metal tank 12 is shown with a cylindrical body or shell 14 and opposed closing domed end caps 14 and 15. In this case, the tank 12 is a dual compartment tank having an internal partition 16 which, effectively, divides the tank 12 into two separate reservoir sections.

The manifold 10 is formed with a generally four-sided housing or body 20 that is adapted to be mounted over a central inlet opening 22 formed in the wall 27 of the associated domed end cap, such as the end cap 15. The body 20 has a central inlet opening 25 that is open into the interior of the tank and positioned axially of the tank. The inlet opening 25 is defined by a first annular lip 26 that is proportioned to extend through the tank opening 22, through the wall 27, into the interior of the tank by a short distance.

The body 20 further forms a second annular lip 28 that is positioned in surrounding relation to the first annular lip 26 and which has a terminal surface 28a adapted to abut the exposed outer surface of the end cap wall 27 when the body 20 is mounted thereon. Also, the lip 28 forms with the lip 26 an annular O-ring receiving recess 29 within which an O-ring 30 is received and is compressed in the space against the adjacent surface of the wall 27 and thereby in pressure engagement with the end cap, for sealing the body 20 to the tank 12.

The body 20 is supported on the end cap by a plurality of mounting feet 35 that extend generally radially of the tank axis and of the inlet 25, at each of four corners of the body 20 as shown in FIG. 3. The feet 35 are proportioned to be supported and mounted on individual studs 36 which in the case of a metal tank are welded to the outer surface of the end cap wall 27 in the appropriate location, and a threaded upper portion 37 of the stud extends through an opening 38 formed in the feet 35 and accepts a retaining nut 40. The studs 36 are welded in place by a drawn arc stud welding machine, as well known in the art. Tubular spacers 42 are positioned over the studs 36 as supports for the feet 35 of the body 20. In this manner, the body 20 is fixably mounted on an end cap with the seal 30 partially compressed within the O-ring groove 29, and with the first annular lip 26 extending through the end cap opening 22 and forming a close mechanical fit thereto.

Figure 1:
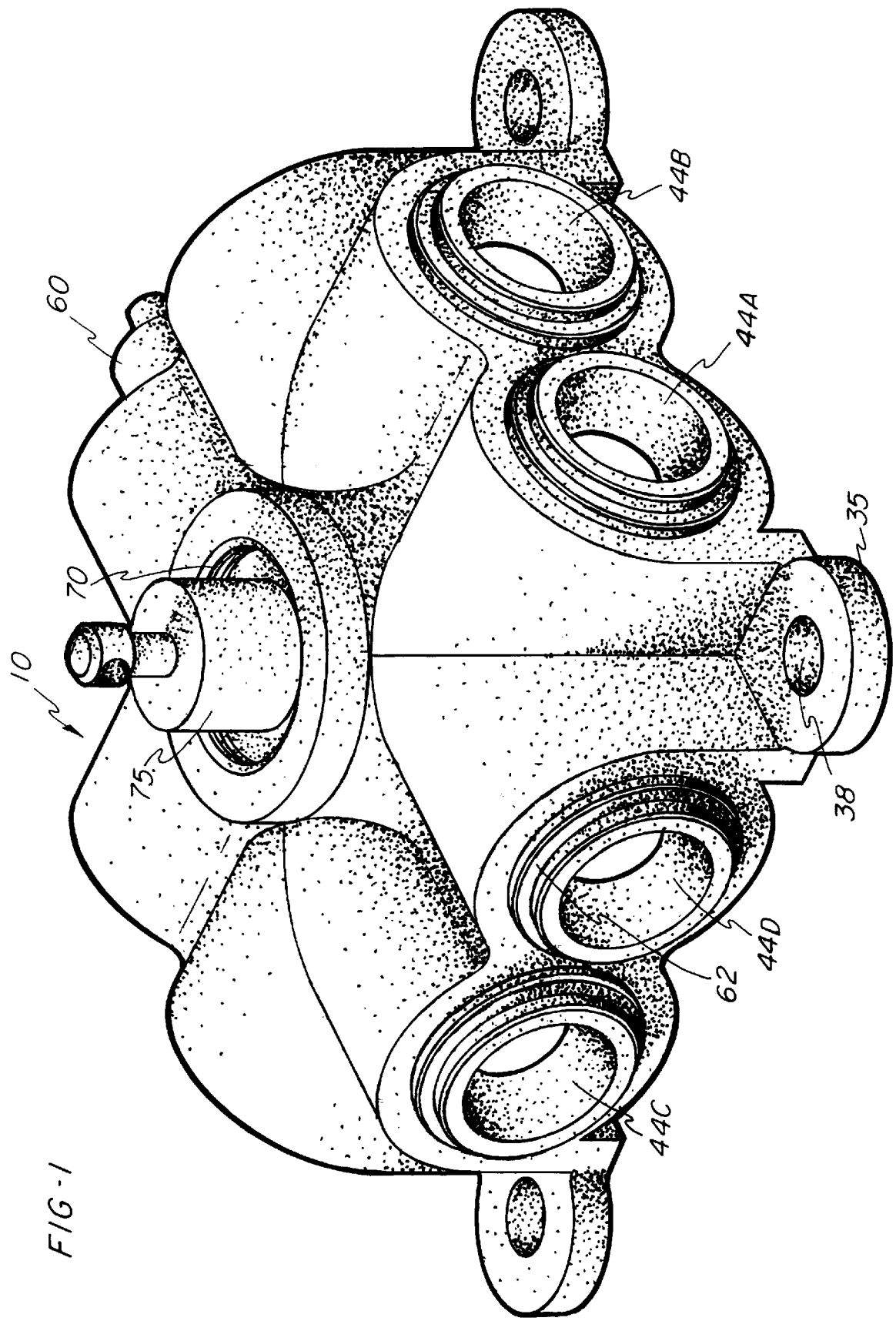
FIG. 1 is a perspective view of one embodiment of an air pressure tank manifold according to this invention.

The body 20 is formed with a plurality of cylindrical passages that intersect the inlet 25 and which extend transversely outwardly from the axis of the inlet 25 in an orthogonal arrangement. Preferably, eight such passages are formed in parallel pairs of two, as shown in FIGS. 1 and 2, so that each passage is in at least partial intersecting relation to the opening, defined by the inlet 25 within the body 20. Therefore, the body 20 of the manifold 10 is formed with a pair of passages 44a and 44b that are in orthogonal relation to a second pair of passages 44c and 44d. Similar passages 44e, f, and 44g, h are located, in pairs, on the remaining four sides of the housing 10. Each passage is identical in construction and is adapted to contain a push-to-connect connector for accepting therein a flexible air line or tube, such as the air line 50 shown in FIG. 2.

Figure 4:
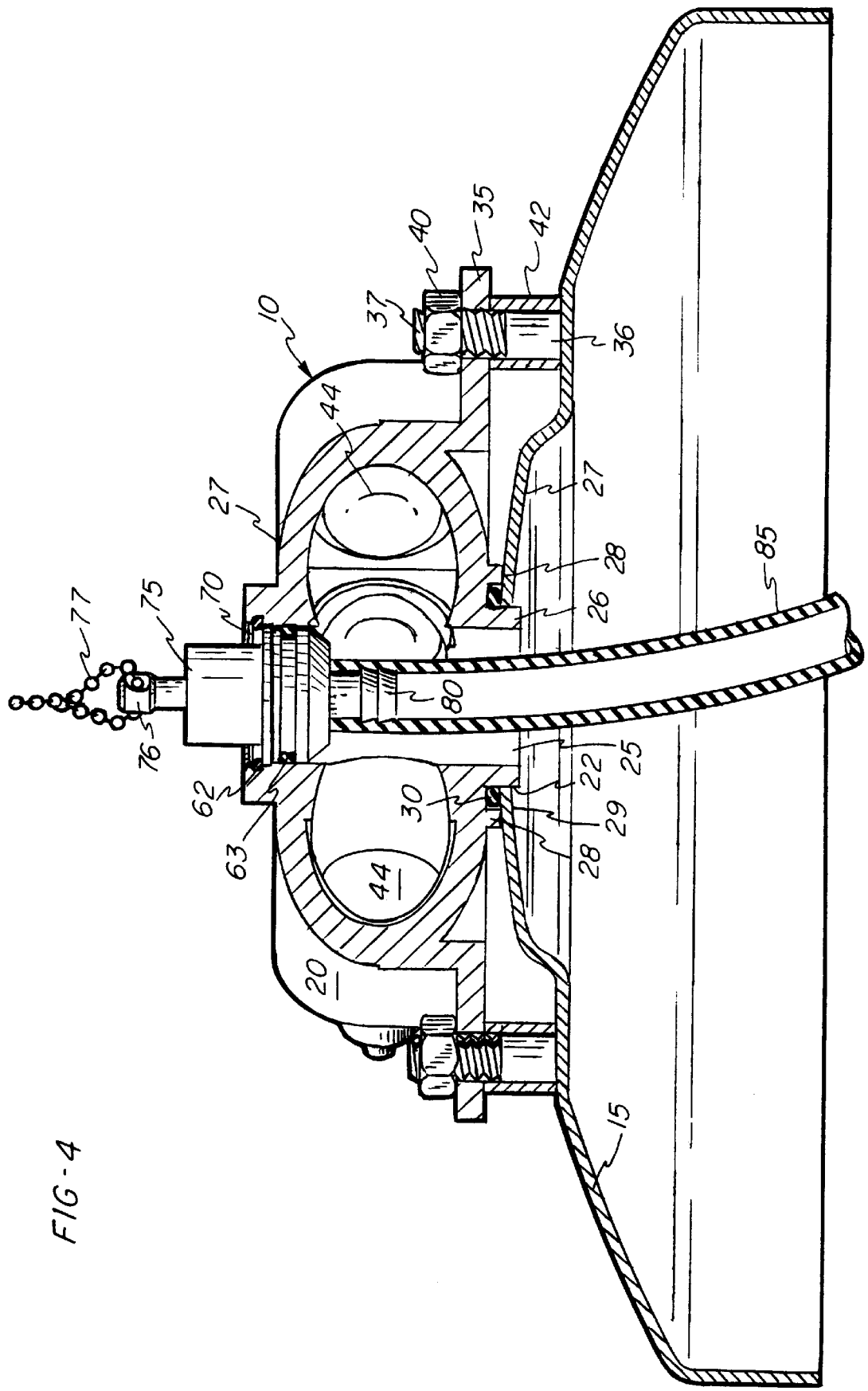
FIG. 4 is an enlarged, partially broken-away view of the manifold of FIG. 3 also showing the flexible drain tubing leading to the water drain valve.
Figure 5:
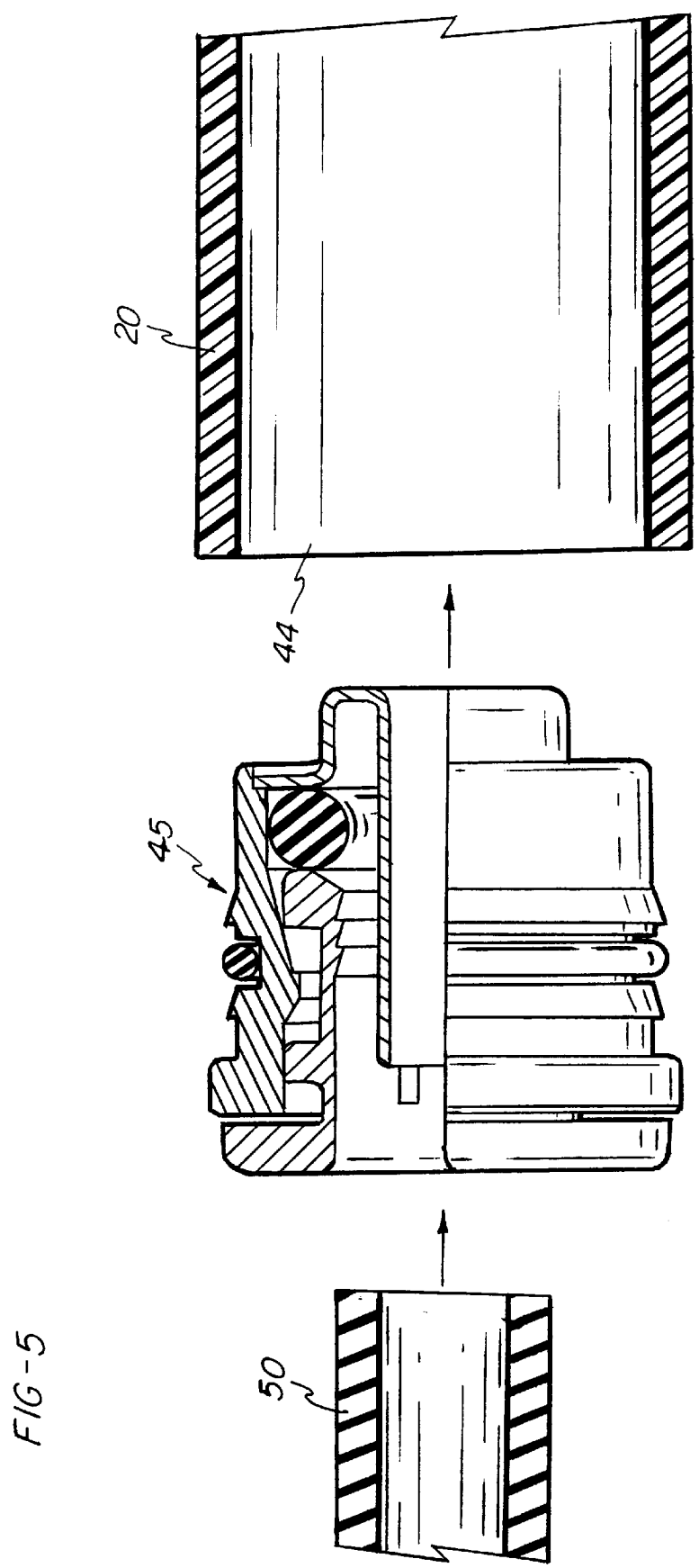
FIG. 5 is an exploded sectional view showing a push-to-connect fitting.

Each of the passages 44 may define either an inlet or outlet port that is connected in common with the remaining passages 44 by the manifold to the inlet 25. While several of the ports defined by the passages 44 may be used for different purposes, at least a plurality are provided with a push-to-connect internal coupling adapted to receive, support and grip a flexible air line 50, as shown in FIG. 5. Such an internal coupling may be made in accordance with the teachings of U.S. Pat. No. 5,230,539 issued Jul. 27, 1993, incorporated herein by reference and offered by the Dana Corporation as part number 117-02200-TAB, 4675 Clark Road, Sarasota, Fla. 34233. At the same time, one of the passages 44 may instead receive a high pressure safety relief valve such as the relief valve part number 410-150 made by GT Development Corporation, 6437 South 44th Street, Tuckwila, Wash. 98168 and identified by the reference numeral 60 in FIG. 3. The pressure relief fitting and similar items that may require service are retained by a snap ring, such as the snap ring 62 retaining the drain valve 75 in FIG. 4, as described below. The remaining items that are installed in the passages 44 of body 20 may be installed permanently using a press fit, as necessary.

The central inlet passage 25 of the manifold 10 is extended through the top 27 of the body and forms an additional upwardly-facing central opening 70, internally configured the same as the passages 44 In other words, the open ends of each of the passages 44 are configured identically to the open end of the opening 70 by which an insert may be received, and retained by the snap ring 62 and sealed by an O-ring 63. The opening 70 is particularly used to receive therein the water drain valve 75. The water drain valve may have a valve pintle 76 which is operated by a pull rope 77 from a remote location, to open the normally closed valve, and the valve 75 may be part number 4102-1 of GT Development Corporation, previously identified.

An inlet stem 80 on the valve 75 receives a flexible water drain tube 85 that extends into the tank interior with an inlet end 90 (FIG. 2) resting on the tank bottom. The inlet end is weighted so that it assumes a position at the lowest part of the tank, and when the valve 75 is opened by pulling on the pintle 76, any water that has collected at the lowest point of the valve will be expelled by the internal air pressure through the tube 85 and out of the valve 75.

It would be within the scope of the invention to place the drain valve 75 in one of the other passages, such as one of the passages 44 as each of the passages 44 and the opening 70 are formed to the same dimensions and configuration for the purpose of interchangeably retaining the particular fittings as may be desired.

Further, one of the passages 44 may receive a one-way check valve therein by means of which air under pressure may be applied to the interior of the tank and then retained under pressure. Such a check valve may be part number SKJ-2058 of $Q_3$ JMC, Inc., 777 Manor Park Drive, Columbus, Ohio 43228.

Figure 6:
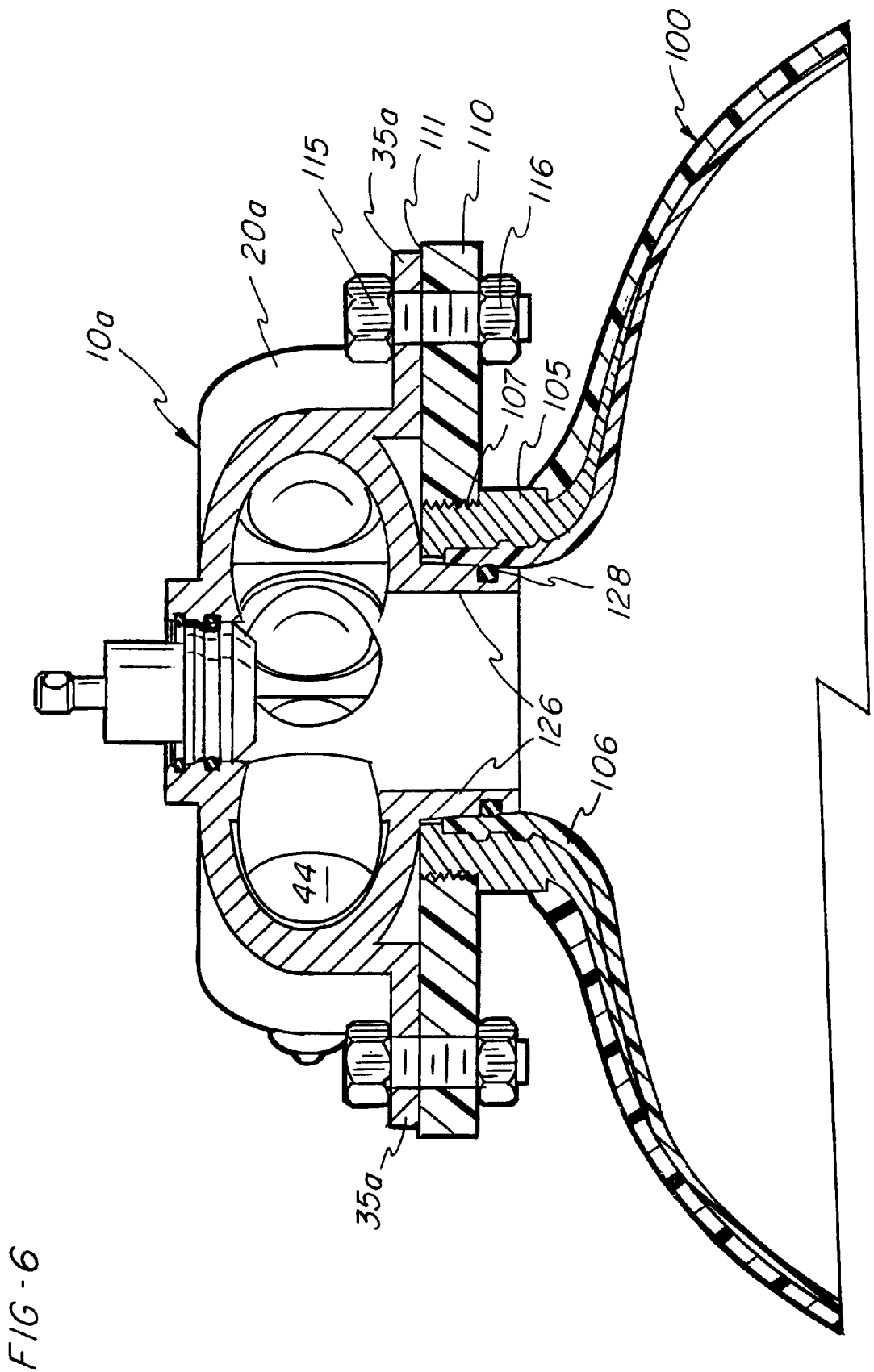
FIG. 6 is a sectional view of another embodiment of the manifold mounted on an end of a composite air tank.

FIG. 6 represents a modified form of the manifold 10a fitted on the end of a filament wound pressure tank, such as the pressure tank described in the Gaiser patent '987, identified above. Where possible, like reference numerals have been used to identify like components of the manifold 10a.

The domed end of a composite filament wound reinforced tank 100 is provided with an integrated metal (or plastic) polar fitting 105. The polar fitting 105 is integrally attached to and forms part of the tank 100. A portion of the air impervious PET lining 106 extends into the interior of the fitting 105 and forms an inlet or outlet opening for the tank.

An exterior cylindrical surface of the fitting 105 is threaded as shown at 107 to receive thereon a annular mounting plate 110. The mounting plate may be made of any suitable material, such as nylon. The plate 110 presents a radially flat mounting surface 111 for accepting the body 20a of the manifold 10a. The mounting plate is threaded onto the threaded annular region 107 of the fitting 105 and bonded permanently in place, such as by using and adhesive.

The body 20a is also provided with a plurality of mounting feet 35a that extend generally radially of the tank axis and of the inlet defined by the fitting 105, and are attached to the plate 110 by bolts 115 extending through openings in the feet 35a and corresponding openings formed in the plate 110 and lock nuts 116. In this manner, the feet 35a are mounted directly against the radial surface 111 of the plate 110.

The body 20a is provided with a central annular lip or skirt 126 which is proportion to extend into the opening and close relation to the PET liner 106 of the opening. The skirt 126 is provided with an outwardly facing O-ring 128 that forms an air tight seal with the liner 106 of the tank 100. In all other respects, the manifold 110a is identical in function and construction to the manifold 10 described above.

It will therefore be seen that the manifolds 10 and 10a of this invention provides for an orderly grouping of the necessary components and air lines at one or the other of the domed ends of an air pressure tank, for a motor vehicle, such as a truck, for supplying pressurized air to the brake system or for other purposes. The multi-function manifold reduces to one the number of openings which needs to be formed into the tank wall, thereby greatly reducing chances of leakage and at the same time, providing an orderly arrangement of the air lines and the water drain valve, as may be required.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A manifold adapted to be fitted to the domed end cap of an air reservoir tank in a truck, which end cap has a hole therethrough comprising a body having a central inlet opening therein, said body having a plurality of outlet passages which open into said inlet opening, said inlet opening being defined by an annular lip which extends from said body and is proportioned to be received within said hole formed in said end cap with said annular lip extending through said hole into the interior of said tank, each of said plurality of outlet passages terminating at an outer surface of said body, and push-to-connect tube retaining fittings received at least some of said passages for receiving a flexible air tube therein.

2. The manifold of claim 1 in which said annular lip comprises a first lip, and further comprising a second annular lip on said body in surrounding relation to said first lip and defining with said first lip an annular O-ring receiving recess, said second annular lip having a terminal surface adapted to a butt an exposed surface of said end cap when said first annular lip is inserted in said end cap hole, said O-ring recess being proportioned to receive an O-ring therein in pressure engagement with said end cap for sealing said body to said tank.

3. The manifold according to claim 2 in which said tank is made of metal, further comprising a plurality of mounting feet on said body extending generally radially thereof, said mounting feet being adapted to be supported on a support stud welded to an outer surface of said end cap for supporting said manifold on said tank.

4. The manifold according to claim 1 in which said air tank is formed as a composite with a metal polar fitting at said domed end in which said fitting defines said hole, further comprising a generally radial annular mounting plate mounted on said fitting, fastener means securing said manifold body to said plate with said annular lip extending into said fitting hole, an annular O-ring recess formed on an outer surface of said annular lip, and an O-ring received in said annular recess in pressure engagement with said fitting to form an air seal with said fitting.

5. A manifold for a motor vehicle air pressure tank for supplying a motor vehicle pneumatic system with air under pressure and for providing a supply of such air to a plurality of air pressure utilization devices, in which the pressure tank has a cylindrical body and a domed end cap with an opening formed in such end cap, comprising a manifold body, said body having a central inlet opening extending therethrough, said body being mounted on said domed and end cap in sealing relation thereto with said central inlet opening in general alignment with said end cap opening and forming an air tight seal between said body and said opening in surrounding relation to said opening, said body further having a plurality of laterally extending cylindrical passages having inner ends opening into the said central inlet opening and having remote outer ends, and each of said passages having a cylindrical section leading inwardly from its said open end, adapted to an air fitting therein.

6. The manifold of claim 5 in which one of said passages at the outer end thereof has a one way check valve therein by which air under pressure may be applied to the interior of said tank through said one passage another one of said open ends has a pressure relief valve therein and responsive to pressure in said tank and openable upon said tank pressure exceeding a predetermined maximum pressure, and a plurality of said passages have push-to-connect tube-receiving fittings therein by which remote air pressure utilization devices may be connected to said tank, said central passage having therein a manually operable normally closed outlet valve, and a flexible hose leading from said outlet valve into said tank interior and having an inlet on the remote end thereof positioned at a gravitational low point in said tank whereby accumulated water may be removed from said tank by manually opening said normally closed outlet valve.

* * * * *